United States Patent [19]

Nishikawa et al.

[11] 4,299,302
[45] Nov. 10, 1981

[54] POWER STEERING DEVICE FOR VEHICLES

[75] Inventors: Masao Nishikawa, Tokyo; Yoshihiko Toshimitsu, Asaka; Toshihiko Aoyama, Tsurugashima; Tokuro Takaoka, Takaidohigashi; Takashi Aoki, Asaka; Yoichi Sato, Fujimi, all of Japan

[73] Assignee: Honda Giken Kogyo Kabushiki Kaisha, Tokyo, Japan

[21] Appl. No.: 92,499

[22] Filed: Nov. 8, 1979

[30] Foreign Application Priority Data

Nov. 14, 1978 [JP] Japan ............................. 53-140695

[51] Int. Cl.³ .................... B62D 3/12; B62D 5/10; F15B 9/10
[52] U.S. Cl. ................................. 180/148; 74/498; 91/467; 92/136
[58] Field of Search .................... 180/148, 147, 146; 74/498, 388 PS; 91/378, 417 R, 368, 467; 92/136

[56] References Cited

U.S. PATENT DOCUMENTS

| | | | |
|---|---|---|---|
| 3,352,170 | 11/1967 | Adams | 74/498 |
| 3,897,845 | 8/1975 | Von Löwis of Menar | 180/148 |
| 4,127,186 | 11/1978 | Koyano et al. | 180/148 |
| 4,141,432 | 2/1979 | Presley | 180/148 |

FOREIGN PATENT DOCUMENTS 2815498 10/1978 Fed. Rep. of Germany ...... 180/148

*Primary Examiner*—Joseph F. Peters, Jr.
*Assistant Examiner*—Donn McGiehan
*Attorney, Agent, or Firm*—Haseltine and Lake

[57] ABSTRACT

An improved power steering device which has a pinion shaft connected with a steering wheel, a rack rod which is connected with steerable wheels and whose rack is in mesh with the pinion of the pinion shaft in the gear box, a power cylinder for hydraulically actuating the rack rod, and a changeover valve for selectively connecting the first and second hydraulic chambers of the power cylinder with the hydraulic pressure source and the oil reservoir. The pinion shaft is rotatably supported in the oscillating cage which is rotatably mounted on the gear box in a manner such that the axis of the oscillating cage is offset a certain distance from the axis of the pinion shaft, whereby the oscillating cage rotates about its axis when the steering torque is applied to the pinion shaft. The oscillating cage is connected with the changeover valve so that the latter is actuated by the rotary movement of the oscillating cage. With this construction, the changeover valve can be made to respond accurately to the steering torque and at the same time it is possible to reduce the size and simplify the structure of the device.

7 Claims, 3 Drawing Figures

POWER STEERING DEVICE FOR VEHICLES

BACKGROUND OF THE INVENTION

This invention relates generally to a power steering device for vehicles, mainly automobiles, and more particularly to a power steering device which comprises a pinion shaft connected with the steering wheel, a rack rod which is connected with the steerable wheels and whose rack is in mesh with the pinion of the pinion shaft in the gear box, a power cylinder for hydraulically actuating the rack rod, and a changeover valve for selectively placing the left- and right-hand side hydraulic chambers of the power cylinder into communication with the hydraulic pressure source and the oil reservoir.

In conventional power steering devices of this type a changeover valve called a rotary valve is widely used. The rotary valve requires a plurality of rotary sealing members to ensure that the actuating oil is supplied to the rotating outer sleeve. These rotary sealing members produce a reasonably large frictional resistance against the recovering action of the steering wheel to its neutral position when the steering wheel is steered a very small angle; therefore the conventional devices do not necessarily provide a good steering feeling. Furthermore, the rotary valve becomes necessarily large in size because of its construction and therefore causes difficulties when being assembled into the vehicles.

SUMMARY OF THE INVENTION

An object of this invention is to provide a power steering device which overcomes the disadvantages described above.

Another object of this invention is to provide a power steering device in which the changeover valve responds accurately to the steering torque and is small in size and simple in construction, and has a small number of sealing members.

To attain the above objectives, there is provided a power steering device according to the present invention, in which the pinion shaft is rotatably supported in an oscillating cage rotatably mounted on the gear box in such a manner that the axis of the oscillating cage is offset a certain distance from the axis of the pinion shaft, the oscillating cage being operatively connected with the changeover valve so that when steering torque is applied to the pinion shaft, the oscillating cage is caused to rotate about its axis thereby to actuate the changeover valve.

Still another object of this invention is to provide a fail-safe power steering device by which the steering of the vehicle can be performed by a human power when a failure occurs in the hydraulic system that drives the power steering device.

Further object of this invention is to provide a power steering device in which the changeover valve is at all times urged toward the neutral position so as to restrain an excessive changeover action of the valve by means of an reaction mechanism.

The above and other objects, features and advantages of the present invention will be apparent from the following detailed description thereof when read in conjunction with the accompanying drawings which illustrate one embodiment of the invention.

DESCRIPTION OF THE PREFERRED EMBODIMENT

Figure 1:
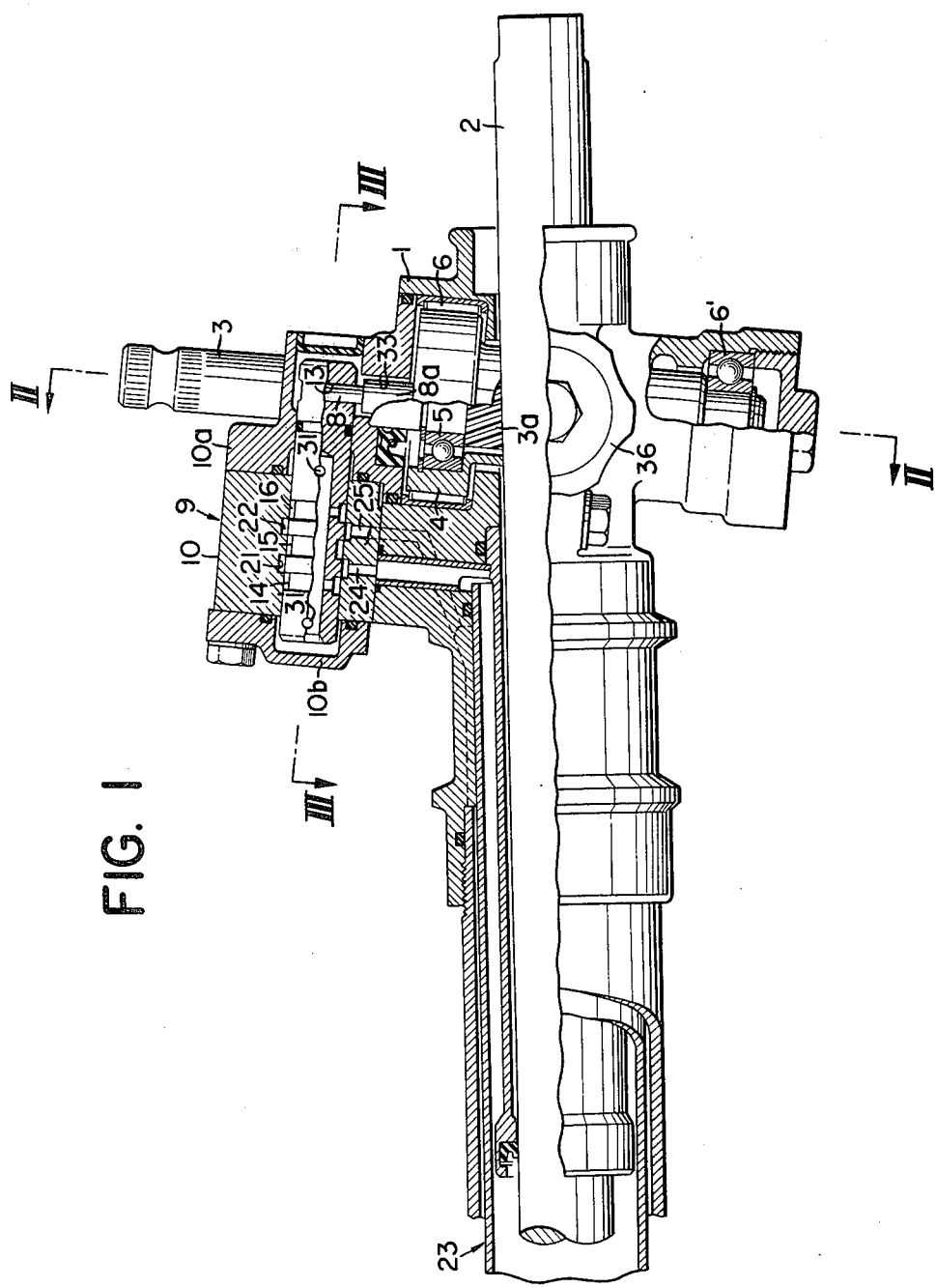
FIG. 1 is a front view of the power steering device according to this invention with essential portions vertically sectioned.
Figure 2:
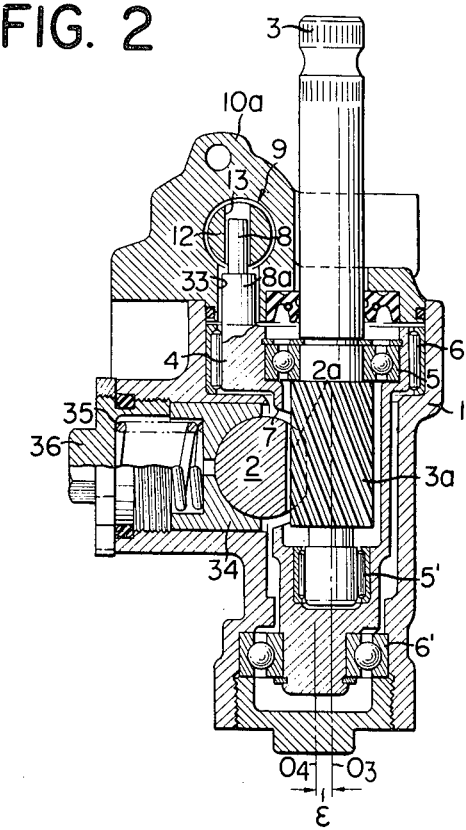
FIGS. 2 and 3 are cross-sectional views taken along the lines II-II and III-III, respectively, of FIG. 1.
Figure 3:
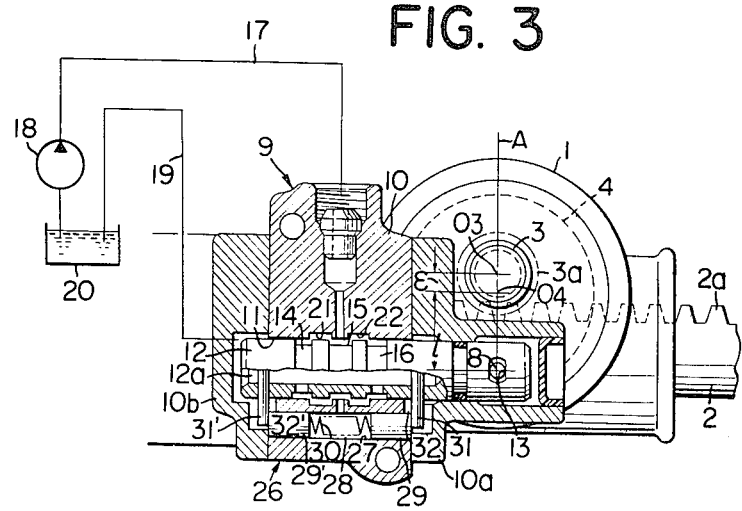

We will now describe one embodiment of this invention with reference to the accompanying drawings.

Reference numeral 1 represents a gear box secured to the chassis of the associated vehicle (not shown) and 2 indicates a rack rod connected with knuckle arms of the steerable wheels (not shown) of the vehicle and extending slidably through the gear box 1. A pinion $3a$ of a pinion shaft 3 connected with the steering wheel (not shown) meshes with a rack $2a$ of the rack rod 2.

The pinion shaft 3 is rotatably supported in an oscillatable cage 4 through a pair of vertically arranged bearings 5, 5', and the oscillatable cage 4 is in turn supported in the gear box 1 through a pair of vertically arranged bearings 6, 6'. The pinion shaft 3 and the oscillatable cage 4 have their center axis offset from each other. In this embodiment shown, the center axis $0_4$ of the oscillatable cage 4 is offset from the center axis $0_3$ of the pinion shaft by $\epsilon$ toward the rack rod 2.

The oscillatable cage 4 is provided at one side with a window 7 to avoid interaction between the cage 4 and the rack $2a$, which comes into meshing engagement with the pinion $3a$ through the window 7. The oscillatable cage 4 has on its upper surface an actuator rod 8 which is integrally formed therewith for actuating the changeover valve 9 and which is offset from the center axis $0_4$ by the distance $l$ greater than the amount of the offset $\epsilon$.

The changeover valve 9 may be of any type if it is a 4-way changeover valve. In this example, the changeover valve 9 is of spool type in which a spool 12 is slidable in the valve bore 11 formed in the valve casing 10. The spool 12 has at one end an elongated slot 13 extending therethrough and elongated in a radial direction of the oscillatable cage 4. The free end of the actuator 8 is received into the slot 13 so that the rotary movement of the oscillatable cage 4 about its axis $0_4$ causes the spool 12 to oscillate to the right and left.

The spool 12 has three annular grooves 14, 15, 16 cut on its outer surface, of which the center groove 15 is connected with a hydraulic pressure source 18 such as a hydraulic pump through an oil supply passage 17 opening into the valve bore 11, while the other grooves 14, 16 on both sides of the center groove 15 are connected with an oil reservoir 20 through an oil return passage 19 communicating with an internal passage $12a$ of the spool 12. The valve casing 10 has two annular grooves 21, 22 parallelly formed on the inner surface of the valve bore 11 with the opening end of the oil supply passage 17 disposed therebetween. These two grooves 21, 22 communicate by way of output hydraulic passages 24, 25 with right- and left-hand side hydraulic chambers of a power cylinder 23 of known construction (a part of which is shown in FIG. 1) provided on the rack rod 2.

Thus, when the spool 12 is displaced rightward or leftward from the neutral position, the right- and left-hand side hydraulic chambers are selectively connected to the oil supply passage 17 and the oil return passage 19, as in the conventional power steering device, with the result that the hydraulic pressure is supplied from the hydraulic pressure source 18 to the hydraulic chamber connected to the oil supply passage 17, causing the rack rod 2 to move toward the right or left and thereby changing the direction of the steerable wheels.

The changeover valve 9 is provided with a reaction mechanism 26 to keep the spool 12 at the neutral position when no steering torque is applied. The reaction mechanism 26 comprises a cylinder 27 formed parallel to the valve bore 11 in the valve casing 10, a pair of pistons 29, 29' slidably received in the cylinder 27 and defining a reaction chamber 28 therebetween, a neutralizing or return spring 30 urging the pistons 29, 29' outwardly, and a pair of engagement pins 31, 31' that protrude from one side of the spool 12 for holding the pistons 29, 29' therebetween, whereby the pistons 29, 29' are restricted against the outward movement by the inner surfaces of covers 10a, 10b provided on both sides of the valve casing 10, and the reaction chamber 28 communicates with the center groove 15 of the spool 12 and therefore with the oil supply passage 17. Those portions of the valve case 10 that face the engagement pins 31, 31' are provided with relief grooves 32, 32' to avoid interaction between the pins and the valve casing when the spool 12 is actuated.

While in this embodiment the reaction mechanism 26 is provided only on one side of the spool 12, it is advantageous in maintaining good sliding property of the spool 12 to provide a pair of reaction mechanisms 26 symmetrically on both sides of the spool 12 so that the bending forces acting upon the spool 12 balance each other.

The base portion 8a of the actuator rod 8 has a large diameter to have a sufficient strength, and an aperture 33 formed in the cover 10a has a still larger diameter to receive the base portion 8a. A clearance is provided between the base portion 8a and the aperture 33 so that the actuator rod 8 can oscillate about 1 mm from the neutral position in either directions of axis of the spool 12. The base portion 8a of the actuator rod 8 having large diameter and the cover 10a with the aperture 33 constitute a fail-safe mechanism in the event of the hydraulic system failure.

A guide piston 34 is received in the gear box 1 on the side opposite to the pinion 3a with respect to the rack rod 2 for slidably supporting one side of the rack rod 2. A spring 35 is interposed between the guide piston 34 and a cap 36 for urging the rack rod 2 toward the pinion shaft 3 through the guide piston 34 so as to eliminate backlash between the meshing rack 2a and the pinion 3a.

Explanation on how the power steering device of this embodiment works is described in the following. When no steering torque is applied to the pinion shaft 3, the neutralizing spring 30 maintains the pistons 29, 29' in contact with the covers 10a, 10b, so that the spool 12 is held at the neutral position by the pair of engagement pins 31, 31' thereby bringing the two annular grooves 21, 22 formed on the interior surface of the bore 11 into communication with the oil supply passage 17 and the oil return passage 19, respectively. Therefore, the power cylinder 23 remains unactuated. When the spool 12 is in the neutral position, the center axis $0_3$ of the pinion shaft 3 lies on the extension of line A connecting the center axis $0_4$ of the oscillating cage 4 and the meshing point between the rack 2a and the pinion 3a.

When the steering torque is applied to the pinion shaft 3 by means of the steering wheel to actuate the rack 2a in the axial direction, the rack 2a imparts to the meshing pinion 3a a reactionary force which is determined by the magnitude and the direction of the actuating force and which tends to rotate the pinion shaft 3 together with the oscillating cage 4 about the center axis $0_4$ of the oscillating cage.

If this rotary moment becomes greater than the opposing moment produced by the set load of the neutralizing spring 30, the pinion shaft begins to rotate with the oscillating cage 4 and the angular displacement of the pinion shaft 3 about the axis $0_4$ is magnified by the lever ratio $1/\epsilon$ and transmitted to the actuator rod 8 of the oscillating cage 4, with the result that the actuator rod 8 produces axial displacement of the spool 12 large enough to ensure the reliable changeover action of the valve 9. This actuates the power cylinder 23, which in turn helps the pinion shaft 3 to drive the rack rod 2.

As the changeover valve 9 is actuated, the reaction chamber 28 of the reaction mechanism 26 is supplied through the oil supply passage 17 with the hydraulic pressure, which is further conducted to the power cylinder 23. The pressure in the reaction chamber 28 acts to displace the pistons 29, 29' outwardly and imparts to the spool 12 through the engagement pins 31, 31' a reactive force urging it toward the neutral position; therefore, excessive changeover movement of the spool 12 can be restricted.

Since the movement of the actuator rod 8 is the movement of the pinion shaft 3 magnified by the lever ratio $1/\epsilon$, the force the actuator rod 8 imparts to the spool 12 is the actuating force of the pinion shaft 3 divided by the lever ratio $1/\epsilon$ so that the effective pressure area in the reaction chamber 28 and therefore the strength of the neutralizing spring 30 can be set smaller than when the actuating force is directly transmitted to the spool. This enables the reaction mechanism 26 to be constructed in a smaller size, which in turn reduces the overall size of the power steering device.

In emergencies such as those where the hydraulic pressure cannot be supplied to the oil supply passage 17 due to failure of the engine or damage to the transmission member that drives the hydraulic pressure source 18, the power cylinder 23 cannot be actuated even if the spool 12 is displaced by the actuator rod 8 of the oscillating cage 4. However, when the actuator rod 8 rotates to a certain extent, it abuts against the wall of the aperture 33 formed in the cover 10b preventing the rotary movement of the oscillating cage 4, so that the steering torque applied to the pinion shaft 3 directly drives the rack rod 2 enabling the safe steering of the vehicle by the human force. In this case, too, since the reactive force imparted from the rack 2a to the pinion 3a is reduced by the ratio $\epsilon/1$ before acting on the actuator rod 8, the required strength of the actuator rod 8 and the required surface pressure strength of the aperture 33 can be reduced by a large margin.

Generally, a tie rod (not shown) connecting the rack rod 2 and the knuckle arms of the steerable wheels is not necessarily parallel to the rack rod 2, and the angle the tie rod makes with the rack rod 2 varies according to the displacement of the latter. Because of this inclination of the tie rod, the road resistance acting upon the steerable wheels either presses the rack rod 2 against the pinion shaft 3 or pull it away from the pinion shaft 3. In either case, the present embodiment of the invention enables the smooth recovery of the changeover valve 9 and therefore the steering wheel to the neutral position because of the following reasons. When the central axis $O_3$ of the pinion shaft 3 is turned leftward or rightward from the neutral position about the axis $O_4$ of the oscillating cage 4, the pinion shaft 3 is slightly displaced toward and pressed against the rack 2—i.e., the pinion shaft 3 has a component of movement toward the rack 2a. Therefore, in a case where the rack rod 2 is pressed against the pinion shaft 3 by the road resistance, the road resistance adds to the force of the neutralizing spring 30 that pushes the central axis $O_3$ of the pinion shaft 3 back to the neutral position. In a case where the rack rod 2 is pulled away from the pinion shaft 3 by the road resistance, the load applied to the bearings 6, 6' of the oscillating cage 4 is reduced, which in turn reduces the friction resistance of the bearings and helps the oscillating cage 4 return to its neutral position.

As already described in the foregoing, this invention has the construction in which the pinion shaft is supported in the oscillating cage which is rotatably supported in the stationary gear box and whose axis is offset from the axis of the pinion shaft by a certain distance, whereby when the steering torque is applied to the pinion shaft, the oscillating cage oscillates about its axis to actuate the changeover valve; hence the changeover valve can be made to respond accurately to the steering torque with a simple construction. Further, since the changeover valve can be of any type, such as spool type and rotary type, and can be constructed independently of the pinion shaft, the device of this invention can be made small and the number of sealing members reduced. Furthermore, the location of the changeover valve can be freely determined around the oscillating cage. This also contributes to the reduction in size and therefore the device of this invention can be installed into the vehicle without difficulty.

Though one preferred embodiment of the invention has been shown and described herein, it will be apparent to those skilled in the art that many changes and modifications may be made therein without departing from the spirit of the invention and the scope of the appended claims.

What is claimed is:

1. A power steering device for a vehicle comprising: a pinion shaft having a pinion and operably connected with a steering wheel; a rack rod operatively connected to steerable wheels and having a rack in mesh with the pinion of said pinion shaft within a gear box; a power cylinder having a first and a second hydraulic chamber for hydraulically actuating said rack rod; a changeover valve for selectively connecting said first and second hydraulic chambers of said power cylinder with a hydraulic pressure source and an oil reservoir; the improvement comprising an oscillating cage rotatably mounted on said gear box and rotatably supporting said pinion shaft in a manner such that the axis of said oscillating cage is offset a certain distance from the axis of said pinion shaft and lies intermediate the axis of the pinion shaft and the meshing point between the pinion and rack, whereby said oscillating cage is caused to rotate about its axis relative to said gear box when steering torque is applied to said pinion shaft; and means for operatively connecting said oscillating cage to said changeover valve such that said changeover valve is actuated by the rotary movement of said oscillating cage.

2. A power steering device as set forth in claim 1, wherein said means for operatively connecting said oscillating cage to said changeover valve comprises an actuator rod projected from said oscillating cage at a location away from the axis of said oscillating cage by a distance larger than the amount of offset between the axis of said pinion shaft and said oscillating cage, said actuator rod being engaged with said changeover valve.

3. A power steering device as set forth in claim 1 or 2, wherein at the time the pinion rod is under zero torque loading, the axis of said pinion shaft lies in the extension of the line which connects the axis of said oscillating cage and the meshing point between said rack and said pinion.

4. A power steering device as set forth in claim 2, wherein said changeover valve comprises a valve casing having a valve bore, and a spool slidably fitted into the valve bore and having an elongated slot radially formed therethrough for receiving the actuator rod.

5. A power steering device as set forth in claim 2 or 4, wherein said gear box has an aperture formed therethrough for receiving said actuator rod with a clearance provided between said aperture and said actuator rod, whereby when said oscillating cage is rotated through a certain angle relative to the gear box, said actuator rod bears against the wall of said aperture to prevent further rotation of said oscillating cage.

6. A power steering device as set forth in claim 4, wherein said spool has a first actuating position for connecting said first and second hydraulic chambers of said power cylinder with said hydraulic pressure source and said oil reservoir, respectively, a second actuating position for connecting said first hydraulic chamber with said oil reservoir and said second hydraulic chamber with said hydraulic pressure source, and a neutral position for bringing said first and second hydraulic chambers into communication with said hydraulic pressure source and said oil reservoir.

7. A power steering device as set forth in claim 6, comprising a reaction mechanism for maintaining said spool at the neutral position.

* * * * *